Oct. 24, 1933. O. R. SWEENEY ET AL 1,931,968
MEANS FOR ACTUATING WATER SOFTENERS
Filed March 3, 1930
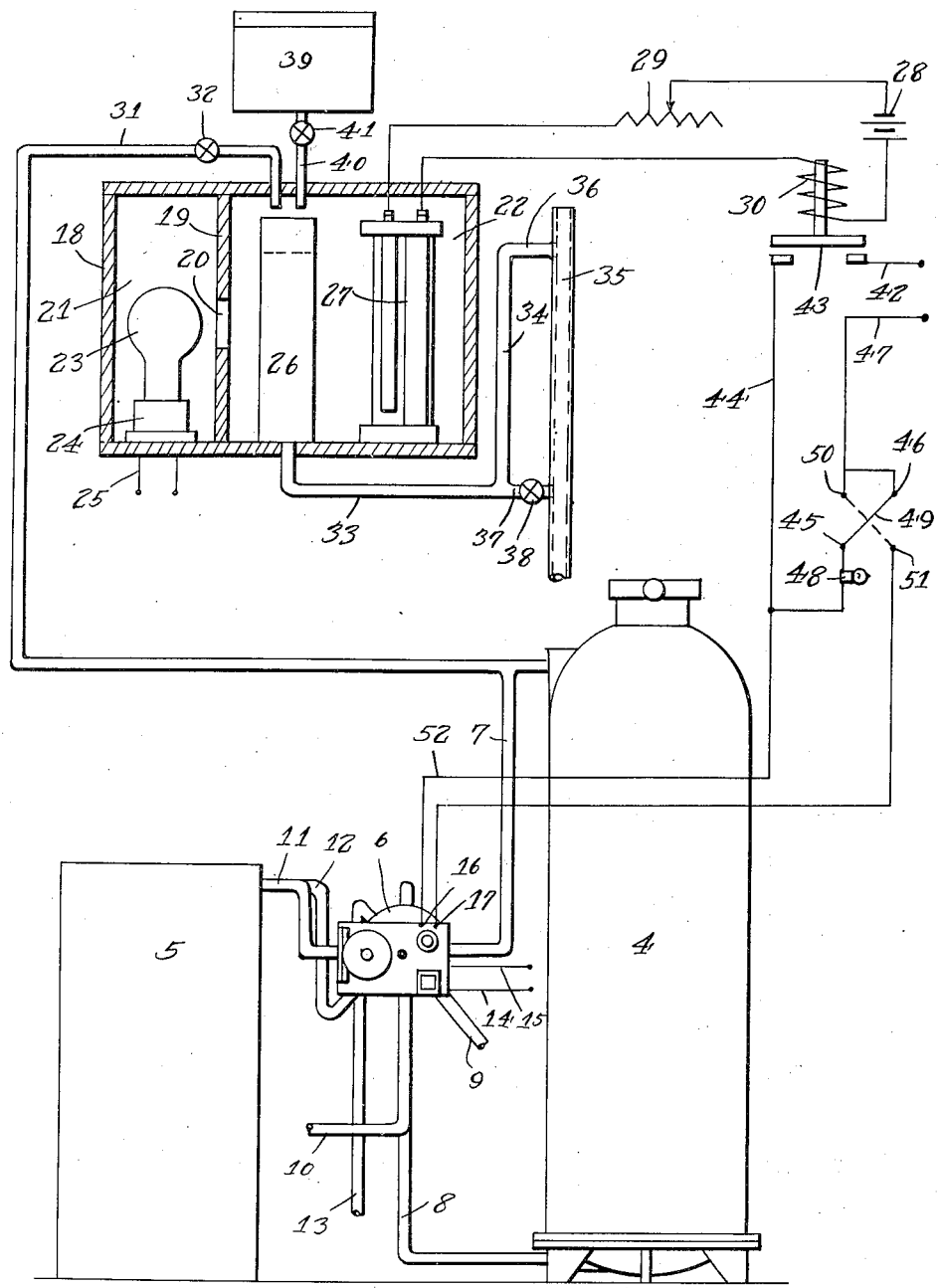
Inventors:
Orland R. Sweeney
Thomas B. Clark
By Wilson, Dowell, McCanna & Rehm
Attys.

Patented Oct. 24, 1933

1,931,968

UNITED STATES PATENT OFFICE

1,931,968

MEANS FOR ACTUATING WATER SOFTENERS

Orland R. Sweeney, Ames, Iowa, and Thomas B. Clark, Rockford, Ill., assignors, by mesne assignments, to The Permutit Company, Wilmington, Del., a corporation of Delaware Application March 3, 1930. Serial No. 432,633

3 Claims. (Cl. 210—24)

Our invention relates to water softening and has particular reference to base exchange softeners of the type in which the regeneration is effected by semi-automatic or automatic means and contemplates generally the provision of automatic and continuous means for testing the hardness of the effluent water from a softener and causing the regeneration mechanism to be set into operation when hard water appears in the effluent line.

It has been customary in the past, in the use of semi-automatic or automatic water softeners, to employ a meter arranged to set the regeneration mechanism into operation when a predetermined amount of water has passed through the softener. The amount of water to be passed through the softener between regenerations was calculated from the hardness of the water being treated. This method appears to be quite satisfactory when the water passing through the softener is of uniform hardness over a prolonged period of time. However, when the hardness of the water changes from season to season and year to year, as is often the case, metering of the water often proves a highly inefficient method of regulating regeneration. For plainly, if the meter is set for water of a certain hardness, and softer water is actually passing through the mechanism, the meter will set the mechanism into regeneration before the bed of base exchange material has become exhausted, thus needlessly wasting salt. On the other hand, if the meter is set for water of low hardness and the water actually passing through the softener is considerably harder, hard water will appear in the effluent line before the mechanism is set into regeneration.

Therefore, one of the objects of our invention is the provision of a water softener wherein regeneration is automatically started when hardness appears in the effluent water, regardless of the amount of water which has passed through the softener since the last regeneration.

We have also aimed to provide a water softener having means for emitting a signal or starting an automatic regenerating mechanism when the effluent water changes from soft water to hard.

We have further aimed to provide a water softener having means for subjecting the effluent water to a continuous soap test.

Another object of the invention is to provide a water softener having means for emitting a signal or starting a mechanism, dependent upon opacity developed in the water by the addition of soap solutions thereto, the opacity varying with the amount of precipitate formed by reaction of the hardness-forming constituent with the soap solution.

A still further object of the invention is to provide a water softener having light actuated means for starting regeneration thereof or producing a signal.

Another aim of the invention is to provide means including a photo-active cell for indicating when the water from the softener attains a predetermined hardness.

Still further other objects and advantages will become apparent to those skilled in the art from the following description and the accompanying drawing.

The figure is a diagrammatic showing of a water softener embodying our invention.

The invention contemplates the provision of a conventional base exchange softener including a softener tank indicated generally by the numeral 4, and a brine tank 5, an automatic mechanism 6 for carrying out the various steps of the regeneration operation, and a hardness detecting mechanism presently to be described.

The hardness detecting mechanism is arranged to continuously test the water for hardness by adding thereto a reagent which is completely soluble in softened water but which reacts with any calcium and magnesium compounds which may appear in the water to form an insoluble opaque precipitate. When the insoluble opaque material is formed in the water, the amount of light from a constant source which may pass through a uniform layer of water is decreased, thus decreasing the amount of light which will fall upon a photo active cell placed in the path of the light. The resulting change in the current developed by the photo-active cell is employed to cause a relay or other suitable electrical device to start the regeneration control mechanism, which is capable of automatically completing the regeneration of the softener.

While any suitable regeneration control mechanisms may be employed we have here shown in outline a control mechanism which is shown more in detail in the copending application of Edward P. McCanna, Serial No. 464,775, filed June 30, 1930, having a valve arranged to make suitable connections as therein described. The outlet line 7 and inlet line 8 connect the top and the bottom of the softener with the control valve; the line 9 is the soft water line through which the effluent water from the softener is conducted to service; the line 10 connects the softener with the water supply and conducts hard water into the system; 11 and 12 connect the brine tank to the control valve, one of them serving to conduct water into the brine tank and the other serving to remove brine from the tank; and line 13 is a drain line connecting the valve to the drain. Electrical conductors 14 and 15 connect the electrical motor of the control mechanism to a source of electric energy and serve to conduct the energy required for the operation of the valve. In the aforementioned application the mechanism is adapted to be thrown into operation by impressing a suitable electrical impulse between the points 16 and 17 of the mechanism. The hardness detecting mechanism previously mentioned and presently to be described serves to accomplish this purpose, providing an electrical impulse between the points 16 and 17 when the hardness of the water in the line 7 reaches a predetermined value.

While numerous methods may be employed for carrying out this purpose we have here shown an arrangement wherein a substantially light tight box 18 is provided, arranged to be divided into two chambers 21 and 22 by means of a partition 19 having a small rectangular slit 20 positioned therein. An electrical bulb 23 is positioned in the smaller chamber 21 upon a suitable base 24 having electrical connection 25 to a source of suitable electrical energy. The electrical bulb 23 is arranged to be lighted at all times during the operation of the machine and to project a constant beam of light through the slit 20, and through an absorption cell 26 onto a photo-chemical or other suitable light sensitive cell 27; shown in the drawing as an electrolytic photo-electric cell.

The photo-chemical cell 27 is of the type having the characteristic of developing an electrical current in proportion to the intensity of light incident thereon. The cell 27 is made to form a portion of an electrical circuit including a battery or other source of suitable electrical energy 28, a variable resistance 29 and a relay 30. The battery 28 serves to supply a substantially constant amount of current to the circuit while the variable resistance 29 permits the adjustment of the current flowing in the circuit to maintain the relay 30 in its open position when light from the bulb 23 is fully incident upon the cell 27, and to permit the relay to close when the current is reduced by reduction of the light falling on the cell 27.

When the relay 30 is closed by a reduction of the current flowing in the circuit 27, 28, 29, and 30, a circuit 42, 43, 44, 45, 46, 47, 48, connected with the power line and carrying a lamp 48 is closed, lighting the lamp and thus emitting a signal to the operator. The numeral 49 indicates a switch which may be thrown to connect either points 45 and 46 or the points 50 and 51. If the switch 49 is thrown to the dotted line position shown connecting the points 50 and 51, when the relay 30 closes, a circuit 42, 43, 44, 52, 16, 17, 51, 50, 47, is closed immediately starting the regeneration of the softener. However, since in many cases it would be extremely inconvenient to have the flow of water in the effluent line 9 discontinued without notice while the softener passes through its regeneration period, we have arranged to provide a supplemental circuit containing the light 48 previously described, for the purpose of emitting a signal and to permit the operator to start regeneration at any desired time by changing the switch 49.

In our invention it is arranged that increase in the hardness of the effluent water cuts down the light on the photo-active cell, whereupon the photo-active cell, actuating a relay, closes the circuit controlling the regenerating operation. We use the following apparatus to make the amount of light incident upon the cell vary with the hardness of the effluent water. A pipe 31 connected to the top of the softener as through line 7 conducts water into the top of the absorption cell 26, a valve 32 serving to permit the regulation of flow of the water through the line 31. The absorption cell 26 is provided with a constant level siphon having a horizontal portion 33 and a vertical portion 34, the length of the vertical portion 34 serving to regulate the height of water obtainable in the absorption cell 26. The vertical portion 34 of the siphon is connected at its upper end to a drain pipe 35 through a horizontal portion 36. The horizontal portion 33 of the siphon is also connected to the drain pipe 35 by means of a pipe 37 having a valve 38 therein. The provision of the portion 37 and the valve 38 permits the absorption chamber 26 to be completely drained when desired to remove any sediment which may develop therein or to permit the flushing of the cell. A container 39 is arranged to hold a quantity of soap solution of desired concentration and supply it drop by drop to the absorption cell 26 through a pipe 40, the flow being regulated by a valve 41.

In the operation of our improved softener, soft water passes through the line 7 during the service run of the softener. A small amount of the water passing through the effluent line 7 is drawn therefrom through the line 31 and carried into the absorption cell 26. Simultaneously with the entrance of water from the line 7 into the absorption cell a small amount of soap solution is permitted to drop into the absorption cell 26 from the container 39. The movement of the water in the absorption cell 26 causes the added soap solution to become mixed therewith and so long as the entering water is soft no change in the appearance of the liquid in the cell 26 will be noticeable. However, when the bed of zeolite approaches exhaustion, hard water will begin to appear in the line 7 and will be carried into the absorption cell 26. When the soap solution mixes with this hard water in the absorption cell 26 a fine opaque precipitate of calcium soap will be formed in the solution. When this occurs the amount of light incident upon the photo-active cell 27 will be reduced. The reduction of light falling upon cell 27 causes a reduction in the current flowing in the circuit 27, 28, 29, 30. The decrease in the current flowing in this circuit causes the relay 30 to be closed, closing the ciruit 42, 43, 44, 52, 16, 17, 51, 50, and 47, thus providing the initial impulse necessary to start the regenerating mechanism 6.

During the rinse step soft water will again appear in the line 31 and pass through the absorption cell 26, carrying with it the precipitated calcium soap. It is thus necessary to so regulate the length of the rinse step and the size of the pipe 31 and of the absorption cell 26 that the cell 26 will be sufficiently clear of precipitate before the softener is returned to service, otherwise the regenerating mechanism 6 would again be thrown into the regenerating step. As the solution in the cell 26 again becomes clear the intensity of the light incident upon the cell 27 increases and the current flowing in the circuit 27, 28, 29, and 30, increases, opening the relay 30. At the end of the regeneration period the mechanism 6 is stopped by mechanism contained therein and will not again be started until the relay 30 is closed by a repetition of the process set forth.

We have found it satisfactory to add the soap to the absorption cell 26 in the proportion of about one volume of soap to one hundred and fifty volumes of water. Such a soap may be advantageously prepared of a concentration such as will require about four dops to produce a lather which will not break for five minutes, on thirty c. c. of softened water. Obviously, however, soap solutions of other concentrations may be used, the concentration of the soap solution and the amount thereof to be added to the cell 26 varying between wide limits. There are a number of other precipitants which may be used such, for example, as ammonium oxalate, calcium hydroxide, sodium phosphate, etc. In each case it will, of course, be necessary to select suitable concentrations of the reagents to produce a sufficient cloud in the absorption cell 26 when hard water appears therein to diminish the amount of light reaching the photo-active cell enough to cause operation of the relay.

While we have shown in the drawing, for the sake of clearness, the pipe 31 as having considerable length, it is advantageous in practice to make this connection as short as possible, thereby holding as small an amount of hard water as possible in the pipe to make the hardness detecting means as sensitive as possible to small changes in the water.

It will be seen that we have provided a simple and direct means for actuating the control mechanism of an automatic water softener by making a continuous hardness test upon the effluent water. As soon as the effluent water reaches a predetermined hardness the mechanism will be automatically thrown into regeneration or, if preferred, the signal lamp will be lighted, indicating that the time for regeneration has come. The operator may defer the regeneration until a more opportune time. It will be seen that the hardness indicator is entirely devoid of moving parts with the exception of a relay arranged to throw the mechanism on at predetermined intervals.

While we have thus described and illustrated a specific embodiment of our invention, we are aware that it may be incorporated in a large number of physical embodiments without departing materially from the spirit of this invention or the scope of the appended claims in which—

We claim:

1. A regenerative base exchange water softening apparatus adapted for automatic operation and comprising a softening tank, a brine tank, conduits for hard water, soft water, brine and waste, valve means for controlling the conduits to provide steps of regeneration, rinsing and return to softening, an electric motor for operating said valve means, an energizing electric circuit therefor, a main motor switch in said circuit, a photo-electric cell, electrical relay means controlled by said cell for closing and opening said switch, a source of light adapted to throw a beam of light upon said cell, a glass vessel positioned between said source of light and said cell, means for feeding into said vessel effluent water from the softening tank, means for feeding into said vessel a reagent solution capable of reacting with hard water to form a precipitate, and outlet means for said vessel, said feeding and outlet means being so arranged that occurrence of a predetermined degree of hardness in said effluent water causes a reaction between said effluent water and said reagent solution in said vessel effecting a change of brightness in the light thrown upon the photo-electric cell and a consequent electrical change in said electrical relay means sufficient to close said motor switch.

2. A regenerative base exchange water softening apparatus adapted for automatic operation and comprising a softening tank, a brine tank, conduits for hard water, soft water, brine and waste, valve means for controlling the conduits to provide steps of regeneration, rinsing and return to softening, an electric motor for operating said valve means, an energizing electric circuit therefor, a main motor switch in said circuit, a photo-electric cell, electrical relay means controlled by said cell for closing and opening said switch, a source of light adapted to throw a beam of light upon said cell, a glass vessel positioned between said source of light and said cell, means for feeding into said vessel effluent water from the softening tank, means for feeding into said vessel a solution of soap capable of reacting with hard water to form a precipitate and outlet means for said vessel, said feeding and outlet means being so arranged that occurrence of a predetermined degree of hardness in said effluent water causes a reaction between said effluent water and said soap solution in said vessel effecting a change of brightness in the light thrown upon the photo-electric cell and a consequent electrical change in said electrical relay means sufficient to close said motor switch.

3. A regenerative base exchange water softening apparatus having a softening tank, a brine tank, conduits for hard water, soft water, brine and waste and provided with valve means operated by an electric motor for controlling the conduits in regeneration and with means for automatically starting regeneration comprising in combination with a switch in the electric circuit for said motor a hardness tester provided with conduit means for introducing thereinto separate flows of effluent water from the softener and of soap solution, said hardness tester being adapted to discharge said liquids in a combined flow, a source of light positioned and arranged to pass a beam of light from said source through the hardness tester, a photo-electric cell positioned to receive the light passing through the hardness tester from said source, enclosing means preventing incidence of light from extraneous sources upon said cell, an electric circuit for said cell and an electromagnetic relay in said circuit adapted to effect closing of the valve operating motor switch upon electrical change in the photo-electric cell circuit as effected by change in the brightness of the light beam reaching said cell through the hardness tester, said change being produced by occurrence of a predetermined degree of hardness in the effluent water mixing with the soap solution and reacting therewith in the hardness tester.

ORLAND R. SWEENEY.
THOMAS B. CLARK.